United States Patent [19]

Retana

[11] 4,224,169
[45] Sep. 23, 1980

[54] FLAME RETARDANT COMPOSITIONS AND METHOD OF PREPARING SAME

[75] Inventor: Alfonso G. Retana, Mexico City, Mexico

[73] Assignee: Promotora de Tecnologia Industrial, S.A., Mexico City, Mexico

[21] Appl. No.: 952,906

[22] Filed: Oct. 19, 1978

[51] Int. Cl.³ .................................................. C09K 3/28
[52] U.S. Cl. ................................. 252/8.1; 106/18.13; 106/18.16; 162/159; 428/921
[58] Field of Search .................... 106/18.13, 18.16; 252/8.1

[56] References Cited

FOREIGN PATENT DOCUMENTS 602189  7/1960  Canada ..................................... 252/8.1
1082512 12/1954  France ..................................... 252/8.1

Primary Examiner—Leland A. Sebastian
Attorney, Agent, or Firm—Sughrue, Rothwell, Mion, Zinn and Macpeak

[57] ABSTRACT

The disclosure relates to compositions for imparting flame retardant properties to various substrates including cellulosic materials, such as paper, cotton and wood, and plastics, such as fabrics made from synthetic polymeric fibers. Aqueous-based compositions of the invention particularly suited to application to cellulosic substrates are multi-component compositions comprising a surfactant, a combination of ammonium iodide, ammonium bromide, ammonium monophosphate, ammonium sulphate, borax, boric acid, sodium silicate and a moistening agent. Another aqueous-based system especially adapted to the treatment of fabrics made from a combination of cellulosic and synthetic fibers comprises a surfactant, hydroxy propyl methyl cellulose, tripropylene glycol, sodium metaborate, chlorinated paraffin hydrocarbon, ammonium diphosphate, ammonium lauryl sulphate, ammonium iodide and other ingredients. An aqueous-based composition comprising an acrylic polymer emulsion base is also disclosed as a flame retardant paint or enamel. Finally, a flame retardant composition having a polyvinyl chloride (PVC) paste base is described for use in providing polymeric materials with flame retardant properties.

9 Claims, No Drawings

FLAME RETARDANT COMPOSITIONS AND METHOD OF PREPARING SAME

BACKGROUND OF THE INVENTION

1. Field Of The Invention

The present invention relates to both aqueous-based and organic-based compositions for use in imparting flame retardant properties to a variety of materials including cellulosic materials, such as paper, cotton fabrics and wood, and also to polymeric materials, such as fabrics and films made from synthetic polymers.

2. Description Of The Prior Art

It is well known in the art that the flame retardant properties of flammable materials can be improved by coating the materials with flame retardant agents or by incorporating into the article itself a flame retardant substance. Literally thousands of flame retardant compositions and agents have been described in the literature, but in view of the importance of this technology, compositions offering improvements in properties continue to be investigated.

In particular, attention has been directed to producing flame retardant compositions which increase the resistance of an article to combustion upon the direct application of flame and at the same time do not deleteriously affect other desired properties of the article, such as strength, physical appearance and handling, absorption and like properties.

Applicant has now developed a series of compositions capable of improving the flame retardancy of articles made from both natural and synthetic materials without serious deterioration in properties of the articles and, in some cases, with increase in certain important properties.

An object of the invention, therefore, is to provide compositions capable of imparting improved flame retardancy to a variety of articles.

A second object of the invention is to provide compositions for improving fire and flame retardancy of articles while at the same time not adversely effecting the desirable properties of the articles to any substantial degree.

A further object of the invention is to provide compositions for improving the resistance of articles to combustion upon the direct application of flame. Other objects of the invention also include the provision of methods for preparing flame retardant compositions having the above-mentioned advantages.

SUMMARY OF THE INVENTION

The invention generally comprises the provision of both aqueous-based and organic-based flame retardant compositions useful in the coating of a variety of substrates and/or in the direct incorporation into manufactured articles so as to improve the flame retardancy of the articles without substantially diminishing the original properties and characteristics of the articles.

As to all of the flame retardant compositions within the scope of the present invention which will be described below, it is important to note that their toxicity index is negligible and that their odor is not unpleasant. These characteristics are important since the products treated with the instant compositions are products which are likely to be utilized in the household, places of public accommodation, vehicles, and the like where non-toxicity towards humans and favorable esthetic characteristics are highly desirable.

I. Aqueous-Based Composition Especially Adapted For Application To Cellulosic Articles In accordance with the present invention, applicant has developed the following compositions particularly suited to the improvements of flame resistance in articles made in whole or in part from cellulosic substances, such as wood, paper, cotton and the like.

The preferred formulations are as follows:

| COMPOUND No. | INGREDIENT | AMOUNT |
|---|---|---|
| 1 | Thiethanolamine Lauryl Sulphate | 0.5–6.0% by volume (5–6 ml/l) |
| 2 | Ammonium Iodide | 2.0–7.0 parts by weight (PBW) |
| 3 | Ammonium Monophosphate | 1.5–8.0 PBW |
| 4 | Ammonium Bromide | 2.0–12.0 PBW |
| 5 | Borax or Sodium Tetraborate | 1.5–20.0 PBW |
| 6 | Boric Acid | 1.5–7.0 PBW |
| 7 | Ammonium Sulphate | 3.5–20.0 PBW |
| 8 | Sodium Silicate | 0.1–1.0% by volume (1–10 ml/l) |
| 9 | 1,2 Propylene Glycol | 1.5–10.0% by volume (15–100 ml/l) |
| 10 | Water | to make one liter |

Certain ingredients may also be added optionally to impart bactericidal and fungicidal properties to the compositions. By way of example, such additives may include acromicine, undecilenic acid and zinc undecilinate.

A particularly preferred composition within the scope of the above formulation is as follows:

| COMPOUND NO. | INGREDIENT | AMOUNT |
|---|---|---|
| 1 | Triethanolamine Lauryl Sulphate | 2.0% by volume |
| 2 | Ammonium Iodide | 3.5 PBW |
| 3 | Ammonium Monophosphate | 7.0 PBW |
| 4 | Ammonium Bromide | 3.0 PBW |
| 5 | Borax | 2.0 PBW |
| 6 | Boric Acid | 4.0 PBW |
| 7 | Ammonium Sulphate | 12.0 PBW |
| 8 | Propylene Glycol | 3.3% by volume |
| 9 | Sodium Silicate | 0.5% by volume |
| 10 | Acromicine | 2.0 PBW |
| 11 | Undecilenic Acid | 1.0 PBW |
| 12 | Zinc Undecilinate | 0.5 PBW |
| 13 | Water | 120.0 PBW |

In preparing the compositions as described above, it has been found to be important to follow a particular procedure. The following method should be employed:

Step 1

Referring to the particularly preferred composition, compounds 2, 3, 4, 5, 6 and 7 are mixed together to form a homogeneous mixture.

Step 2

Compounds 8, 10, 11 and 12 are mixed together to form a homogeneous mixture.

Step 3

To the product of Step 1, a portion of the water sufficient to dissolve the compounds, e.g., 50% of the total water, is added and the composition is heated to 70° C. with agitation continuously until the solids are dissolved. It is important to mention that the dissolution temperature of these ingredients should not exceed about 70° C. in order to avoid the loss of molecular water in the boric acid which could yeild metaboric or tetraboric acid, depending upon the temperature. Maintenance of the temperature below 70° C. is also important to prevent the boric acid from crystalizing.

Step 4

To one liter of the product of Step 3, there are added the compounds 9 and 1 plus the balance of the water. At this stage, the mixture of compounds 10, 11 and 12 from Step 2 is also added.

In utilizing the foregoing compositions, they may be applied in any conventional fashion to the surface of materials for the purpose of improving the flame retardancy of such materials. As earlier noted, the foregoing compositions are particuarly suited to production of cellulosic articles of improved flame retardancy. Coating might be done by immersion of the article, spraying, painting, roller coating or otherwise surface coating the article. It is also possible that the composition might be incorporated into the article, such as paper, by being added at one of the final stages of paper production, certainly at a stage beyond the point at which the composition might be washed-out or diluted.

When applied to paper and textiles, the foregoing composition surpasses the standards of the A.S.T.M. and N.F.P.A. with respect to combustion testing.

Besides improving fire retardancy, the particularly preferred compositions which incorporate the antibacterial and anti-fungal agent also have been found to increase the physical properties of cellulosic materials to which they are applied.

After treatment, substrate materials subjected to standard laboratory tests showed the following properties.

Sample 1

A 5 g piece of paper was treated with 20%, by weight, of this product on a dry basis. The original paper characteristics were affected as follows:
1. Strength
    a. Tensile strength—increased by 20%.
    b. Loosen strength—increased by 10%.
    c. Weathering normal oxidation not affected.
    d. Absorption—unchanged.
2. Physical Appearance
    Opacity—increased by 0.20%.
3. Permeability
    Permeability—affected by 5%.
4. Color
    Color—change detectable only with spectrographic methods and increases by 0.2%.
5. Utilities
    a. Printability—settled inks better by 20%.
    b. Adhesive applications—increased adherence by 10%.
6. Chemical Resistance
    Reaction to acids, alkalis and solvents is not increased or decreased after treatment.
7. Direct Flame Application
    The treated paper is fire retardant. When direct flame is applied, the paper carbonizes where the flame is in direct contact, but there is no proliferation of the flame; when the flame is suspended, the flame disappears and the heat immediately is dissipated.
8. Indirect Heat Application
    Paper carbonizes in an oven at 541.2° F. without flame.

Sample 2

A fabric swatch of cotton fiber containing a maximum of 40% synthetic fibers was treated with 20-30%, by weight, on a dry basis, of the fire retardant composition. The original characteristics of the fabric were affected as follows:
1. Strength
    a. Tensile strength—increased by 30%.
    b. Abrasion strength—increased by 10%.
    c. Durability—increased from 5-15%.
    d. Weathering—not affected under the same conditions as the untreated fabric.
2. Physical Characteristics
    a. Roughness—slightly increased.
    b. Brightness—not changed.
3. Permeability And/Or Absorption
    No important changes.
4. Reaction To Colorants
    Not affected in appearance, but colorants settled by 15%.
5. Utilities
    a. Printability—cloth printings are not altered. Detergent action on the printed cloth does not affect the fiber or its appearance.
    b. Abrasion resistance—increased by 20%.
    c. Heat resistance—increased by from 5 to 15%.
6. Chemical Resistance
    Influence of acids, alkalis and solvents is substantially unaffected by treatment.
7. Direct Flame Application
    The fabric carbonizes with no proliferation of the flame; when the flame is suspended, the flame disappears as does the heat.
8. Indirect Heat Application
    Fabric carbonizes at 541.2° F. without flame.

II. Composition For Application To Cellulosic Or Plastic Articles

The compositions of the present invention for use in imparting flame retardancy to articles made of a combination of cellulosic and plastic materials are capable of increasing flame resistance to a degree higher than any of the individual ingredients of the formulation are capable of doing. The compositions described below are preferably applied to fabrics made up of blends of cellulosic and synthetic fibers and particularly blends which include approximately 50% cotton and 50% synthetic fibers.

The formulations are prepared by producing a homogeneous mixture of the individual ingredients or components and then adding water at the final stage of the mixing.

The preferred compositions of this type have the following formulations:

| INGREDIENT | AMOUNT (% by wt.) |
|---|---|
| Chlorinated Paraffin Hydrocarbons (Any chlorinated hydrocarbon having approximately 42%, by weight, of chlorine can be used, e.g., CLORAFIN 22) | 1.0–8.0% |
| Diisopropyl Ketone | 0.5–5.0% |
| Methyl Chloroform | 0.5–5.0% |
| Sodium Tungstate | 0.5–5.0% |

-continued

| INGREDIENT | AMOUNT (% by wt.) |
| --- | --- |
| Sodium Metaborate | 0.5–5.0% |
| Sodium Lauryl Sulphate | 0.5–15.0% |
| Hydroxy Propyl Methyl Cellulose | 5.0–15.0% |
| Tripropylene Glycol | 1.0–8.0% |
| Fatty Alcohol | 1.0–8.0% |
| (Any primary alcohol with $C_8$—$C_{11}$ carbon chain, generally linear, may be used) | |
| Ortho Phenyl Phenol | 0.1–2.0% |
| Phenyl Mercuric Acetate | 0.2–2.0% |
| Ammonium Diphosphate | 1.0–8.0% |
| Ammonium Lauryl Sulphate | 1.0–8.0% |
| (This ingredient can be replaced by ammonium iodide used in the same proportion) | |
| Water | |

As the result of laboratory experiments in the application of such compositions to fabrics and other articles made from a combination or blend of cellulosic and synthetic polymeric materials, it appears that a particularly preferred formulation has the following composition:

| INGREDIENT | AMOUNT (% by wt.) |
| --- | --- |
| Chlorinated Parraffin Hydrocarbon | 5.0% |
| Diisopropyl Ketone | 2.5% |
| Methyl Chloroform | 2.5% |
| Sodium Tungstate | 2.0% |
| Sodium Metaborate | 5.0% |
| Sodium Lauryl Sulphate | 10.0% |
| Hydroxypropyl Methyl Cellulose | 10.0% |
| Tripropylene Glycol | 5.0% |
| Fatty Alcohol | 2.0% |
| Ortho Phenyl Phenol | 2.0% |
| Phenyl Mercuric Acetate | 0.2% |
| Ammonium Diphosphate | 5.0% |
| Ammonium Lauryl Sulphate/ Ammonium Iodide | 5.0% |
| Water | 43.8% |

In one typical application of the above compositions, the material may be applied to a rug as a shampoo without dilution. In an application to fabrics such as upholstering fabrics, cloth or garments, drapes, etc., the above formulation is preferably diluted with about 50%, by volume, of water. All mixing and diluting operations are preferably performed at room temperature.

III. Composition For Use As Flame Retardant Paint Or Enamel

This composition provides an aqueous-based material useful as a flame retardant coating which may be applied in the same manner as conventional paints and enamels.

The composition is prepared by homogeneously mixing the individual components with water. The compositions of the present type have the following formulation:

| INGREDIENT | AMOUNT (% by wt.) |
| --- | --- |
| Emulsion Of Acrylic Polymer | from 23 to 28% |
| Water | 43.8–53.6% |
| Hydroxy Propyl Methyl Cellulose | 1.2–1.4% |
| Tripropylene Glycol | 0.8–1.0% |
| Fatty Acid Alkanolamide | 0.9–1.1% |
| Ethyloxylated Ketosteracrylic Alcohol | 0.9–1.1% |
| Phenyl Mercuric Acetate | 0.18–0.24% |
| Chlorinated Paraffin Hydrocarbon | 5.1–6.3% |
| (Any chlorinated hydrocarbon can be used, such as CLORAFIN 22, which has approximately 42%, by weight, of chlorine) | |
| Sodium Tungstate | 2.0–2.4% |
| Perchlorethylene | 2.0–2.4% |
| Barium Metaborate | 0.9–1.1% |
| Diisopropyl Ketone | 1.9–2.3% |
| Ammonium Phosphate | 4.5–5.5% |
| Ammonium Iodide | 2.7–3.3% |
| Silicic Acid (Hydrated Silica) | 0.27–0.33% |

As a result of laboratory experimentations with paints and enamels within the above formulations, it has been determined that the particularly preferred formulation is as follows:

| INGREDIENT | AMOUNT (% by wt.) |
| --- | --- |
| Emulsion Of Acrylic Polymer | 25.5% |
| Water | 48.7% |
| Hydroxy Propyl Methyl Cellulose | 1.3% |
| Tripropylene Glycol | 0.9% |
| Fatty Acid Alkanolamide | 1.0% |
| Ethyloxylated Ketosteracrylic Alcohol | 1.0% |
| Phenyl Mercuric Acetate | 0.2% |
| Chlorinated Paraffin Hydrocarbon | 5.7% |
| Sodium Tungstate | 2.2% |
| Perchlorethylene | 2.1% |
| Barium Metaborate | 1.0% |
| Diisopropyl Ketone | 2.1% |
| Ammonium Phosphate | 5.0% |
| Ammonium Iodide | 3.0% |
| Silicic Acid | 0.3% |

Laboratory tests of paints and enamels formed from the above formulations compared with conventional paints and enamels when applied to substrates, such as wood, show the following effects on the properties of the products:

1. Physical Appearance—Unchanged
2. Ease Of Application—Unchanged.
3. Adherence—Increased by 20%.
4. Plasticity—Unchanged.
5. Durability—Increased by 12%.
6. Resistance To Corrosion—Increased by 7%.
7. Resistance To Weathering—Increased by 20%.
8. Permeability—Increased from 3 to 7%.
9. In paint manufacturing processes, the compositions do not alter the paint color; however, when incorporated in a previously prepared paint product, the formulation darkens the color of the original paint slightly.
10. Fire Resistance
    Especially when applied to cellulosic materials, the composition avoids fire proliferation upon direct application of flame.

IV. Composition For Application To Synthetic Polymeric Substrates

The following compositions are useful in providing polymeric articles having improved fire retardancy and anti-oxidation characteristics. The compositions may be utilized by coating them on or impregnating them into polymeric articles by any known process, such as immersion, spray coating, painting, blending, etc. Under certain conditions, the compositions may also be incorporated directly into polymeric articles by adding the compositions to the polymerization matrix and separating and recovering the polymerizate together with the fire retardant composition upon completion of polymerization.

The preferred compositions within the scope of the invention have the following formulations:

| INGREDIENT | AMOUNT (% by wt.) |
|---|---|
| Polyvinyl Chloride, e.g., Geon 121 | 30.0–50.0% |
| Dioctyl Phthalate | 18.0–26.0% |
| Tricresyl Phosphate | 10.0–15.0% |
| Cadmium and/or Tribasic Lead Sulphate, e.g., Ferro Mx (3091) | 1.0–3.0% |
| Calcium Carbonate | 6.0–7.0% |
| Plasticizer, e.g., Cereclor 552 or 70 | 11.0–14.0% |
| Aluminum | 3.0–4.0% |
| Antimonium Trioxide | 3.0–4.0% |

As a result of laboratory experimentation, the following composition within the scope of the above formulations has been found to be particularly preferred:

| INGREDIENT | AMOUNT (% by wt.) |
|---|---|
| Polyvinyl Chloride, e.g., Geon 121 | 38.0% |
| Dioctylphthalate | 22.2% |
| Tricresylphosphate | 12.7% |
| Cadmium and/or Tribasic Lead Sulphate, e.g., Ferro Mx (3091) | 1.3% |
| Calcium Carbonate | 6.3% |
| Plasticier, e.g., Cereclor | 3.1% |
| Aluminum (Powder) | 3.1% |
| Antimonium Trioxide | 3.7% |

In the above formulation, the antimonium trioxide may be replaced in the same proportion by methyl chloroform or sodium tungstate.

What is claimed is:

1. A composition for imparting flame retardancy to flammable materials comprising the following ingredients in the approximate amounts indicated:

| Compound No. | | |
|---|---|---|
| 1 | Triethanolamine Lauryl Sulphate | 0.5–6.0% by Volume (5–6 ml/l) |
| 2 | Ammonium Iodide | 2.0–7.0 parts by weight (PBW) |
| 3 | Ammonium Monophosphate | 1.5–8.0 PBW |
| 4 | Ammonium Bromide | 2.0–12.0 PBW |
| 5 | Borax or Sodium Tetraborate | 1.5–20.0 PBW |
| 6 | Boric Acid | 1.5–7.0 PBW |
| 7 | Ammonium Sulphate | 3.5–20.0 PBW |
| 8 | Sodium Silicate | 0.1–1.0% by volume (1–10 ml/l) |
| 9 | 1,2 Propylene Glycol | 1.5–10.0% by volume (15–100 ml/l) |
| 10 | Water | to make one liter |

2. A composition in accordance with claim 1 comprising the following ingredients in the approximate amounts indicated:

| COMPOUND NO. | | |
|---|---|---|
| 1 | Triethanolamine Lauryl Sulphate | 2.0% by volume |
| 2 | Ammonium Iodide | 3.5 PBW |
| 3 | Ammonium Monophosphate | 7.0 PBW |
| 4 | Ammonium Bromide | 3.0 PBW |
| 5 | Borax | 2.0 PBW |
| 6 | Boric Acid | 4.0 PBW |
| 7 | Ammonium Sulphate | 12.0 PBW |
| 8 | Propylene Glycol | 3.3% by volume |
| 9 | Sodium Silicate | 0.5% by volume |
| 10 | Acromicine | 2.0 PBW |
| 11 | Undecilenic Acid | 1.0 PBW |
| 12 | Zinc Undecilinate | 0.5 PBW |
| 13 | Water | 120.0 PBW |

3. A process for preparing compositions in accordance with claim 1 comprising the following steps:
(a) mixing homogeneously compounds 2, 3, 4, 5, 6 and 7 in the approximate amounts indicated;
(b) adding to the mixture of step (a) a portion of the water to dissolve the compounds, while maintaining the temperature of the resulting solution at or below about 70° C.; and
(c) dissolving in the mixture of step (b) compounds 9 and 1 in the amounts indicated and the balance of the water and also adding the mixture of compounds 8, 10, 11 and 12 to the mixture of step (b).

4. A composition for imparting flame retardancy to flammable materials comprising the following ingredients in the approximate amounts indicated:

| | |
|---|---|
| Chlorinated Paraffin Hydrocarbons [(Any chlorinated hydrocarbon having approximately 42%, by weight, of chlorine can be used, e.g., CLORAFIN 22)] | 1.0–8.0% |
| Diisopropyl Ketone | 0.5–5.0% |
| Methyl Chloroform | 0.5–5.0% |
| Sodium Tungstate | 0.5–5.0% |
| Sodium Metaborate | 0.5–5.0% |
| Sodium Lauryl Sulphate | 0.5–15.0% |
| Hydroxy Propyl Methyl Cellulose | 5.0–15.0% |
| Tripropylene Glycol | 1.0–8.0% |
| A Primary Alcohol Having A $C_8$–$C_{11}$ Carbon Chain | 1.0–8.0% |
| Ortho Phenyl Phenol | 0.1–2.0% |
| Phenyl Mercuric Acetate | 0.2–2.0% |
| Ammonium Diphosphate | 1.0–8.0% |
| [Ammonium Lauryl Sulphate] [(This ingredient can be replaced by ammonium iodide used in the same proportion)] | 1.0–8.0% |
| A Compound From The Group Consisting Of Ammonium Lauryl Sulphate And Ammonium Iodide | |
| Water | 36.0–60.0% |

5. A composition in accordance with claim 4 comprising the following ingredients:

| | |
|---|---|
| Chlorinated Parraffin Hydrocarbon | 5.0% |
| Diisopropyl Ketone | 2.5% |
| Methyl Chloroform | 2.5% |
| Sodium Tungstate | 2.0% |
| Sodium Metaborate | 5.0% |
| Sodium Lauryl Sulphate | 10.0% |
| Hydroxypropyl Methyl Cellulose | 10.0% |
| Tripropylene Glycol | 5.0% |
| A Primary Alcohol Having A $C_8$–$C_{11}$ Carbon Chain | 2.0% |
| Ortho Phenyl Phenol | 2.0% |
| Phenyl Mercuric Acetate | 0.2% |
| Ammonium Diphosphate | 5.0% |
| Ammonium Lauryl Sulphate/ Ammonium Iodide | 5.0% |

6. A composition for imparting flame retardancy to flammable materials comprising the following ingredients in the approximate amounts indicated:

| Ingredient | Amount |
|---|---|
| Emulsion Of Acrylic Polymer | from 23 to 28% |
| Water | 43.8–53.6% |
| Hydroxy Propyl Methyl Cellulose | 1.2–1.4% |
| Tripropylene Glycol | 0.8–1.0% |
| Fatty Acid Alkanolamide | 0.9–1.1% |
| Ethyloxylated Ketosteracrylic Alcohol | 0.9–1.1% |
| Phenyl Mercuric Acetate | 0.18–0.24% |
| Chlorinated Paraffin Hydrocarbon | 5.1–6.3% |
| Sodium Tungstate | 2.0–2.4% |
| Perchlorethylene | 2.0–2.4% |
| Barium Metaborate | 0.9–1.1% |
| Diisopropyl Ketone | 1.9–2.3% |
| Ammonium Phosphate | 4.5–5.5% |
| Ammonium Iodide | 2.7–3.3% |
| Silicic Acid (Hydrated Silica) | 0.27–0.33% |

7. A composition in accordance with claim 6 comprising the following ingredients in the approximate amounts indicated:

| INGREDIENT | AMOUNT (% by wt.) |
|---|---|
| Emulsion Of Acrylic Polymer | 25.5% |
| Water | 48.7% |
| Hydroxy Propyl Methyl Cellulose | 1.3% |
| Tripropylene Glycol | 0.9% |
| Fatty Acid Alkanolamide | 1.0% |
| Ethyloxylated Ketosteracrylic Alcohol | 1.0% |
| Phenyl Mercuric Acetate | 0.2% |
| Chlorinated Paraffin Hydrocarbon | 5.7% |
| Sodium Tungstate | 2.2% |
| Perchloroethylene | 2.1% |
| Barium Metaborate | 1.0% |
| Diisopropyl Ketone | 2.1% |
| Ammonium Phosphate | 5.0% |
| Ammonium Iodide | 3.0% |
| Silicic Acid | 0.3% |

8. A composition for imparting flame retardancy to flammable materials comprising the following ingredients in the approximate amounts indicated:

| INGREDIENT | AMOUNT (% by wt.) |
|---|---|
| Polyvinyl Chloride | 30.0–50.0% |
| Dioctyl Phthalate | 18.0–26.0% |
| Tricresyl Phosphate | 10.0–15.0% |
| Cadmium and/or Tribasic Lead Sulphate | 1.0–3.0% |
| Calcium Carbonate | 6.0–7.0% |
| Plasticizer | 11.0–14.0% |
| Aluminum | 3.0–4.0% |
| Antimonium Trioxide | 3.0–4.0% |

9. A composition in accordance with claim 8 comprising the following ingredients in the approximate amounts indicated:

| INGREDIENT | AMOUNT (% by wt.) |
|---|---|
| Polyvinyl Chloride | 38.0% |
| Dioctylphthalate | 22.2% |
| Tricresylphosphate | 12.7% |
| Cadmium and/or Tribasic Lead Sulphate | 1.3% |
| Calcium Carbonate | 6.3% |
| Plasticizer | 3.1% |
| Aluminum (Powder) | 3.1% |
| Antimonium Trioxide | 3.7% |

* * * * *